(12) United States Patent
Reinecke

(10) Patent No.: US 11,723,308 B2
(45) Date of Patent: Aug. 15, 2023

(54) COMBINE LOSS MONITOR MAPPING

(71) Applicant: CNH Industrial America LLC, New Holland, PA (US)

(72) Inventor: Clay Alan Reinecke, Sedgwick, KS (US)

(73) Assignee: CNH Industrial America LLC, New Holland, PA (US)

( * ) Notice: Subject to any disclaimer, the term of this patent is extended or adjusted under 35 U.S.C. 154(b) by 632 days.

(21) Appl. No.: 16/263,365

(22) Filed: Jan. 31, 2019

(65) Prior Publication Data

US 2020/0245557 A1 Aug. 6, 2020

(51) Int. Cl.
*G06F 16/909* (2019.01)
*A01D 41/127* (2006.01)
*G06F 16/901* (2019.01)
*G06F 16/248* (2019.01)
*G06F 16/26* (2019.01)
(Continued)

(52) U.S. Cl.
CPC ....... *A01D 41/1273* (2013.01); *G06F 16/248* (2019.01); *G06F 16/26* (2019.01); *G06F 16/29* (2019.01); *G06F 16/904* (2019.01); *G06F 16/909* (2019.01); *G06F 16/9024* (2019.01); *G06F 16/9038* (2019.01); *G06Q 50/02* (2013.01)

(58) Field of Classification Search
CPC ... A01D 41/1273; G06F 16/904; G06F 16/26; G06F 16/29; G06F 16/9038; G06F 16/248; G06F 16/909; G06F 16/9024; G06Q 50/02; A01B 79/005

See application file for complete search history.

(56) References Cited

U.S. PATENT DOCUMENTS 6,195,604 B1  2/2001  Moore et al.
8,930,039 B2  1/2015  Murray et al.
(Continued)

FOREIGN PATENT DOCUMENTS

EP  3125670 B1  1/2019
WO  2013078328 A2  5/2013

OTHER PUBLICATIONS

"Tableau maps" by tlubben, dated Oct. 22, 2018 and retrieved from https://vizualintelligenceconsulting.com/blog-tableau-maps/ (Year: 2018).*

(Continued)

*Primary Examiner* — Sanchita Roy
(74) *Attorney, Agent, or Firm* — Peter K. Zacharias

(57) ABSTRACT

An agricultural combine having at least one loss sensor associated with a threshing and separating system, a processing device, and a user interface. The processor is configured to collect geographical position readings, operating parameter settings, and loss data readings. The operating parameter settings and loss data readings are associated with the position readings. The processor generates a display at the user interface illustrating a geographical map including at least a portion of the plurality of position readings. The geographical map graphically indicates each loss data reading associated with each position reading illustrated on the geographical map at that position reading's respective location on the geographical map. A system and method for evaluating the performance of an agricultural combine are also provided.

22 Claims, 7 Drawing Sheets

(51) Int. Cl.
*G06F 16/29* (2019.01)
*G06F 16/9038* (2019.01)
*G06F 16/904* (2019.01)
G06Q 50/02 (2012.01)

(56) References Cited

U.S. PATENT DOCUMENTS

| | | | |
|---|---|---|---|
| 9,002,594 B2 | 4/2015 | Wilken et al. | |
| 9,226,449 B2 | 1/2016 | Bischoff | |
| 2011/0213531 A1 | 9/2011 | Farley et al. | |
| 2014/0331631 A1* | 11/2014 | Sauder | G01B 21/10 |
| | | | 56/10.2 R |
| 2015/0199775 A1 | 7/2015 | Pfeiffer et al. | |
| 2015/0338281 A1* | 11/2015 | Ross | G01K 3/14 |
| | | | 236/44 A |
| 2016/0235002 A1* | 8/2016 | Sauder | A01B 79/005 |
| 2017/0032473 A1* | 2/2017 | Koch | A01D 41/127 |
| 2017/0071125 A1 | 3/2017 | Pfeiffer et al. | |
| 2017/0112061 A1 | 4/2017 | Meyer | |
| 2017/0115862 A1 | 4/2017 | Stratton et al. | |
| 2017/0303465 A1* | 10/2017 | Koch | A01B 79/005 |
| 2018/0120133 A1 | 5/2018 | Blank et al. | |
| 2019/0347745 A1* | 11/2019 | Bones | G06F 16/29 |

OTHER PUBLICATIONS

Extended European Search Report for EP Application No. 20154984.7 dated Jun. 5, 2020 (six pages).

* cited by examiner

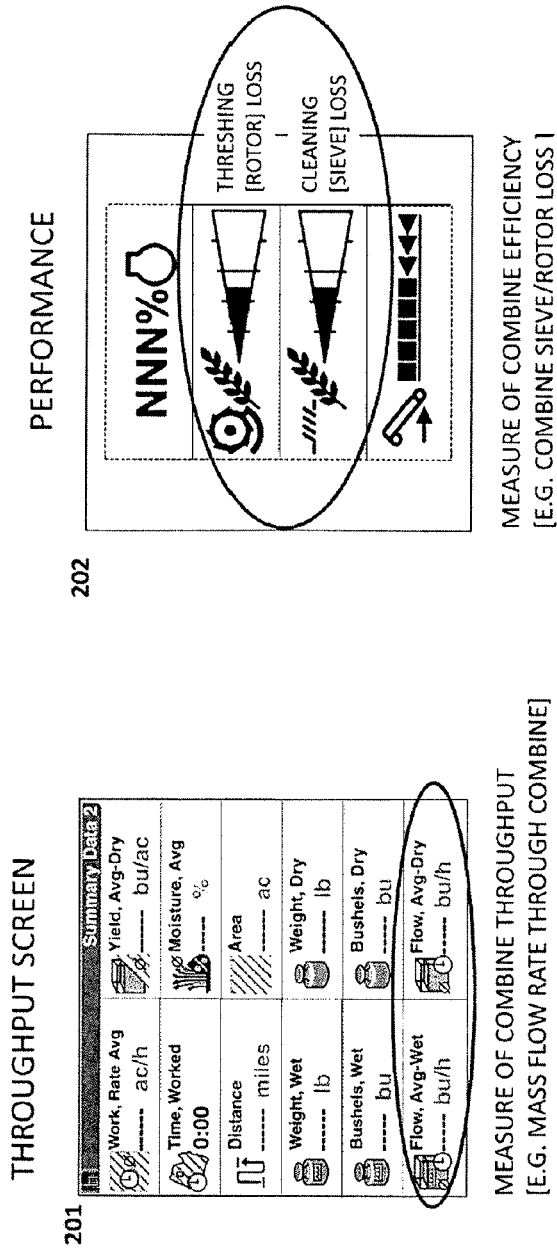

COMBINE LOSS MONITOR MAPPING

BACKGROUND OF THE INVENTION

A typical combine harvester cuts crop using a wide cutting header. The cut crop may be picked up and fed into the combine's threshing and separating mechanism, which typically includes a rotating threshing rotor or cylinder to which grooved steel bars, commonly referred to as rasp bars or threshing elements, may be bolted. One or more "concaves," in the shape of half drums or the like, are located next to the threshing rotor. The rasp bars thresh and aid in separating the grains from the chaff and straw through the movement of the rotor relative to the concaves. The concaves have meshes or openings to allow grain, chaff and smaller debris to fall, and may also be fitted with steel bars to assist with threshing. Straw that is too large or long to pass through the concaves is carried through to an outlet. A spreader mechanism returns the chaff, straw, and other undesired material to the field.

In an axial flow combine, this threshing and separating system serves a primary separation function. The harvested crop is threshed and separated as it is conveyed between a longitudinally arranged rotor and the inner surface of an associated chamber comprising threshing and separating concaves, and a rotor cage or cover. The cut crop material spirals and is conveyed along a helical path along the inner surface of the chamber until substantially only larger residue remains. When the residue reaches the end of the threshing drum, it is expelled out of the rear of the combine. Meanwhile, the grain, chaff, and other small debris fall through the concaves and grates onto a cleaning device or shoe. For ease of reference, this smaller particulate crop material that contains the grain and chaff is referred to as threshed crop. The grain still needs to be further separated from the chaff by way of a winnowing process.

Clean grain is typically separated from the threshed crop by series of chaffers, sieves and blowers. Generally, the cleaning system operates by mechanical and pneumatic methods; blowing air through the threshed crop to winnow the chaff and then sieving the grain to separate the grain from other particulates. Clean grain that is separated from residue via the sieves is typically transported to a grain tank in the combine for temporary storage. The grain tank is typically located atop the combine and loaded via a conveyer that carries clean grain collected in the cleaning system to the grain tank.

In normal operation, a combine operator tries to optimize the performance of the combine by making various adjustments to operational parameters of the combine and then trying to quantify the positive/negative effect of the change. Various functional components or parameters of a combine can be adjusted by the operator, and their effects on the operating efficiency of the combine can be monitored. For example, the forward speed of the combine can be controlled by the operator to change the rate of crop intake. As speed increases, so too does the amount of material collected. However, it is typical that once the combine reaches a certain forward speed, the amount of material lost (i.e., crop ejected from the combine lost without being collected) begins to increase dramatically. This is because the threshing process can only handle a certain volume of material regardless of the forward speed of the combine, and at a certain speed collected grain begins to be lost as the thresher separation process cannot keep up with the amount of material collected.

The combine may include a loss monitor to help indicate the efficiency of the grain capture process. A loss monitor measures the amount of lost grain material and an indicator in the cab of the combine may display this measured amount to the operator via a gauge reading or a graph on a digital display. Additionally, an audible alarm may sound indicating the high loss levels to the operator. The operator may then adjust the ground speed such that the amount of grain collected is balanced against the amount of grain being lost, thus running the combine at the most efficient forward speed. Additional functional components such as the sieves, blowers, grates, and other components can be adjusted as well, to try to reduce grain loss.

A typical loss monitor has multiple sensors to detect grain leaving the combine. For example, a loss monitor might include one or more sensors located behind an axial flow rotor cage or a straw walker to detect grain that is ejected from the threshing system along with the larger straw, without passing into the separating shoe or sieves. A loss monitor also may include one or more sensors located behind the chaffer sieve or a grain collection shoe to detect grain being ejected from the separating system with the chaff. Such sensors typically comprise piezoelectric sensors that are calibrated to detect contact by grains, but other sensors may be used.

Output from the loss monitor may be transmitted to a visual feedback system ("display") in the combine cabin. It has been found that such displays can have several drawbacks. For example, a typical loss sensor display only shows loss information in real-time, and the output value may constantly fluctuate as the density, type of crop, grain wetness, and other factors change during harvesting. In order to provide a historical reading over time, the operator must watch the display output and mentally assign a value to the average readout level. This process must be done almost concurrently for many different parameters. The process is therefore prone to errors and the accuracy is subjective and limited in scope.

Loss monitors have also been viewed with some skepticism because they require frequent calibration to the crop type and operating conditions, and the calibration can be disrupted by altering the combine's operating parameters, such as the ground speed. Loss monitors have also been perceived to have difficulty at accurately detecting particularly light grains, such as rapeseed. Also, loss monitors do not provide feedback on the crop yield or inform the operator when it is necessary to unload grain from the combine.

Loss can also be estimated by physically inspecting samples of harvested material in the field to determine any associated loss. This process is time consuming and can require special procedures and attention to obtain reliable data representative of the combine performance. Furthermore, manual inspection cannot keep up with changes to crop conditions and operating parameters that occur while the combine is operating.

This description of the background is provided to assist with an understanding of the following explanations of exemplary embodiments, and is not an admission that any or all of this background information is necessarily prior art.

SUMMARY OF THE INVENTION

In one exemplary embodiment, there is provided an agricultural combine having a threshing and separating system, at least one loss sensor associated with the threshing and separating system, a processing device, a user interface having an input interface and an output interface, and a non-transitory computer readable storage medium operably connected to the processing device and the user interface. The storage medium stores a set of instructions that, when executed by the processor, cause the processor to: collect, from a plurality of sensors operably connected to the processing device, data related to the operation of the combine, the data including a plurality of geographical position readings from one or more geographical position sensors, a plurality of operating parameter settings from one or more user-changeable operating features of the combine each operating parameter setting being associated with a respective one of the position readings, and a plurality of loss data readings from the at least one loss sensor each loss data reading being associated with a respective one of the position readings, generate a display at the output interface illustrating a geographical map including at least a portion of the plurality of position readings, and graphically indicate, on the geographical map, each loss data reading associated with each position reading illustrated on the geographical map at each position reading's respective location on the geographical map.

In another exemplary embodiment, there is provided a system for evaluating performance of a combine. The system includes a processing device, a user interface having an input interface and an output interface, and a non-transitory computer readable storage medium operably connected to the processing device and the user interface. The storage medium stores a set of instructions that, when executed by the processor, cause the processor to: collect, from a plurality of sensors operably connected to the processing device, data related to the operation of the combine, the data including a plurality of position readings from one or more geographical position sensors, a plurality of operating parameter settings from one or more user-changeable operating features of the combine each operating parameter setting being associated with a respective one of the position readings, and a plurality of loss data readings from at least one loss sensor each loss data reading being associated with a respective one of the position readings, generate a display at the output interface illustrating a geographical map including at least a portion of the plurality of position readings, and graphically indicate, on the geographical map, each loss data reading associated with each position reading illustrated on the geographical map at each position reading's respective location on the geographical map.

In another exemplary embodiment, there is provided a method for evaluating performance of a combine. The method includes: collecting data related to the operation of the combine, the data including a plurality of geographical position readings, a plurality of operating parameter settings for one or more user-changeable operating features of the combine each operating parameter setting being associated with a respective one of the position readings, and a plurality of loss data readings each loss data reading being associated with a respective one of the position readings; generating a display at an output interface illustrating a geographical map including at least a portion of the plurality of position readings; and graphically indicating, on the geographical map, each loss data reading associated with each position reading illustrated on the geographical map at each position reading's respective location on the geographical map.

BRIEF DESCRIPTION OF THE DRAWINGS

Embodiments of inventions will now be described, strictly by way of example, with reference to the accompanying drawings, in which:

FIG. 2 illustrates various examples of output interface displays.

DETAILED DESCRIPTION OF THE DRAWINGS

Figure 1A:
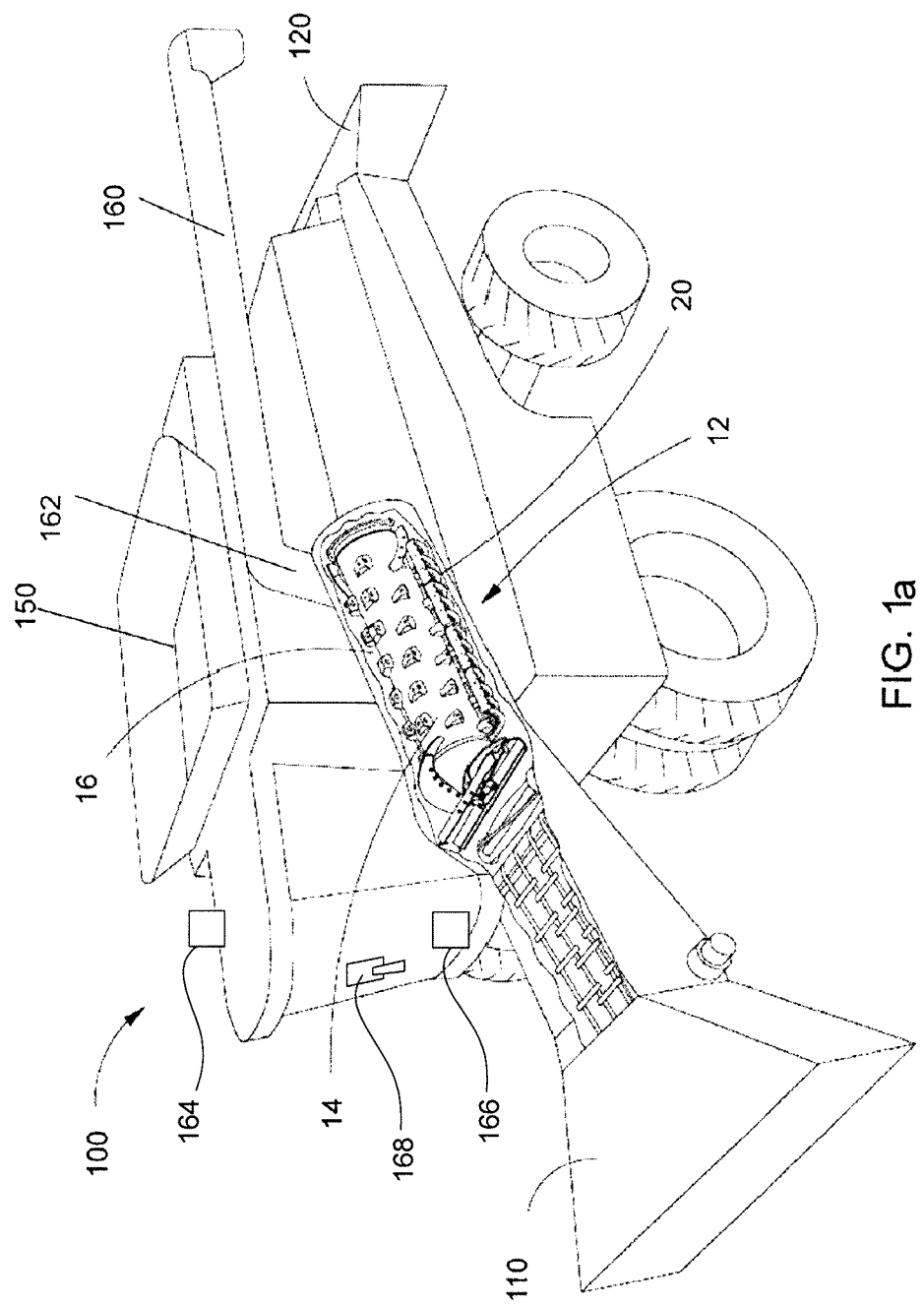
FIG. 1a is a perspective view of an agricultural combine.

The drawing figures depict one or more implementations in accord with the present concepts, by way of example only, not by way of limitations. In the figures, like reference numerals refer to the same or similar elements.

FIG. 1a shows an exemplary agricultural combine 100, which may also be referred as a combine or harvester throughout this specification. As shown in FIG. 1a, the combine 100 can include a header 110, a longitudinally axially arranged threshing and separating system 12, and a concave 20 within the threshing and separating system 12. The threshing and separating system may also have other known configurations, as known in the art, and embodiments are not limited to an axial threshing system or those having concaves 20. For example, in some embodiments, the concave 20 may be used with a combine having a transversely aligned threshing and separating system, straw walkers, or other devices for threshing the crop.

The exemplary axial threshing and separating system 12 is axially arranged, in that it includes a cylindrical threshing rotor 14 supported and rotatable in a predetermined direction about a rotational axis therethrough for conveying a flow of crop material in a helical flow path through a threshing chamber 16 extending circumferentially around the rotor 14. Concaves 20 may extend circumferentially adjacent the rotor 14 and the flow of crop may pass in the space between the spinning rotor and the concaves 20. As the crop material flows through the threshing and separating system 12, the crop material including, for example, grain, straw, legumes, and the like, is loosened and separated from crop residue or MOG (material other than grain) such as, for example, husks, cobs, pods, and the like. The separated materials are then carried away from the threshing and separating system 12 in a well-known conventional manner, and crop residue can be redistributed to the field via a spreader 120, located at the back of the combine 100.

The remaining threshed crop, which includes the grain to be collected, is then cleaned via a cleaning system (not shown). The cleaning system can include conventional winnowing mechanisms including a fan that blows air across a series of reciprocating sieves. The winnowing action of the air and the reciprocating sieves separates the grain from the remaining chaff and collects the clean grain. The clean grain may then be conveyed to a grain tank 150 via conventional devices, such as a cross auger that conveys grain laterally from the bottom of the cleaning system to a vertical conveyor (or elevator) that conveys grain up a load tube to be spilled into the grain tank 150. One or more cross augers may be provided at the bottom of the grain tank 150 to move grain to an unloading system. In the shown example, the unloading system is a turret-style system having an unload tube 160 and a vertical tube 162. The vertical tube 162 may include an auger for propelling grain up and to another auger within the unload tube 160. The unload tube 160 may be rotated to extend laterally for unloading grain from the grain tank 150 to a support vehicle, such as a truck that is driving along the side of the combine 100. Unload tube 160 may also be oriented to the rear for storage, as shown. Alternatively, in a swivel-style offloading system (not shown), the vertical tube 162 and unload tube 160 are replaced by an unloading auger that is attached to the one or more cross augers conveying grain from the cleaning system and may pivot from side to side to deliver grain from the combine 100. Other alternatives and variations will be apparent to persons of ordinary skill in the art in view of the present disclosure.

The combine 100 includes one or more adjustable operating components. For example, the combine 100 may allow adjustment of: ground speed, operating speed of the threshing rotor 14 or other threshing mechanism, position of the concave 20 relative to the rotor 14, positions (spacing, tilt angle, etc.) of separating system sieves or shoes, cleaning fan speed, and so on. Each controllable component includes an associated controller to operate the component. Similarly, each adjustable component may include a feedback or feed-forward sensor to indicate the current setting of the component.

Figure 1B:
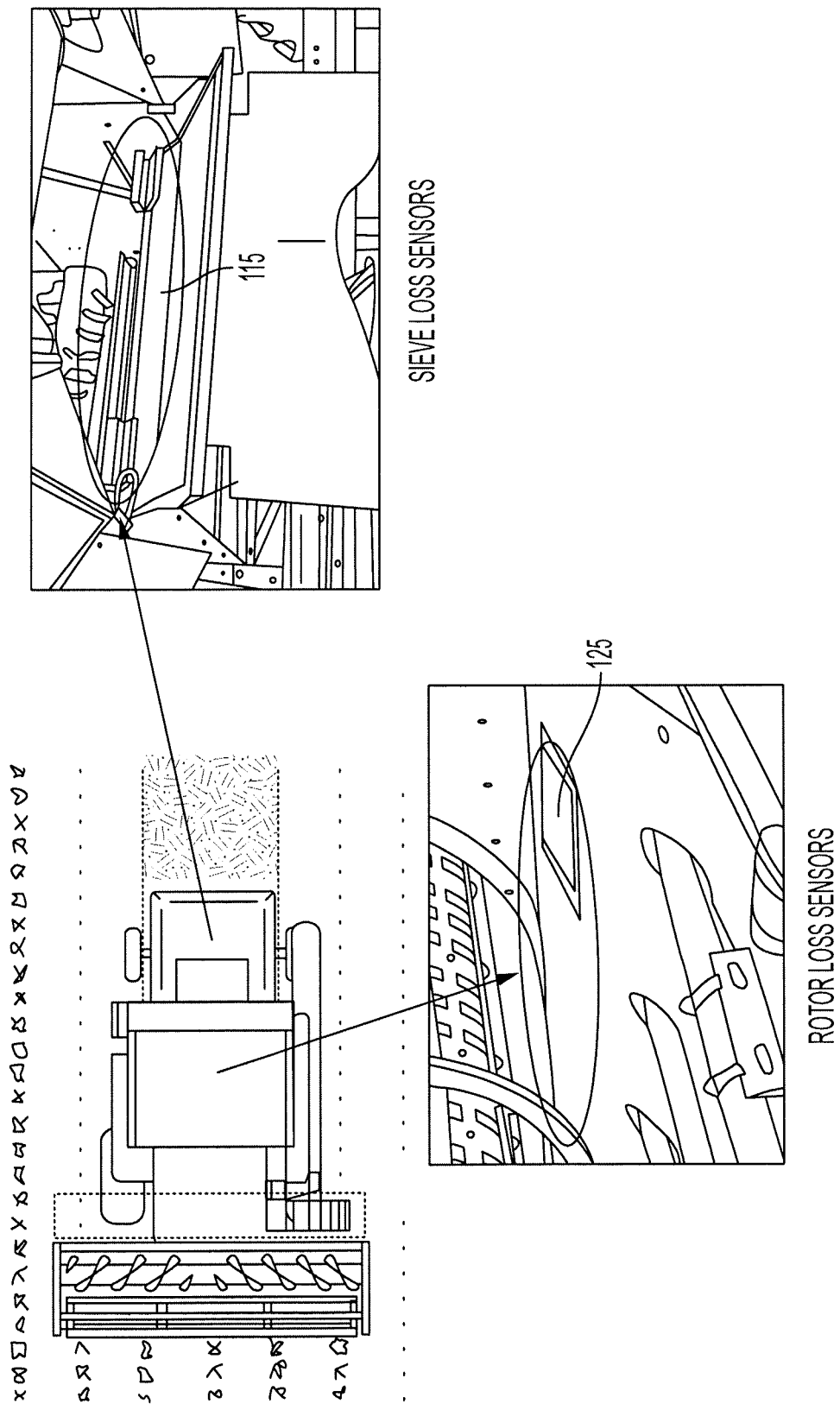
FIG. 1b illustrates various loss sensor locations on the agricultural combine according to an embodiment.

The combine 100 also includes one or more environmental sensors to evaluate status conditions within and around the combine 100. For example, the combine 100 may include a moisture meter to evaluate grain wetness, weight sensors to evaluate grain loading, mass flow rate sensors to evaluate crop processing rate, an odometer to measure distance, ground speed sensors, timers, global positioning or other navigation sensors 164 to indicate the combine's physical position, and so on. The combine 100 also includes one or more loss sensors to detect grain that is exiting the combine 100. For example, as shown in FIG. 1b, the combine 100 may include one or more sieve loss sensors 115 at the end of the grain separating sieve, and/or one or more rotor loss sensors 125 at the outlet of the threshing rotor 14 or other threshing mechanism. The grain loss sensors 115 detect grain as it leaves the combine from the separating system, and the rotor loss sensors 125 detect grain as it leaves the combine from the threshing system. Each loss sensor 115, 125 may include one or more piezoelectric sensors that operate by detecting the impingement of grain upon the sensor body, as known in the art, but other sensor devices may be used.

The combine 100 includes a control system 166 for operating the various adjustable components, and monitoring the operation of the machine. Input may be provided to the control system 166 using various different control devices, such as manually-operable throttles or mechanical adjusters, and electronic input controls. In one example, the control system 166 includes a consolidated input interface, such as a computer having input controls (keyboard, mouse, touchscreen, buttons, etc.) for changing various operating parameters, which may be operable to control all of the combine's operative components or may be operable in conjunction with separate controls for some control inputs (e.g., a manually-operated throttle for controlling ground speed). Any variety of input controls may be used, as known in the art.

The control system 166 also collects data relating to the operation of the combine 100 from the various operating component sensors and environmental sensors, and presents some or all of this data to the combine operator via an output interface 168, such as one or more gauges, screens, or the like. For example, the output interface 168 may comprise a digital screen that is operable to graphically indicate any variety of different sensor output information. The output interface 168 also may operate as an input interface for receiving control inputs from the operator. For example, the output interface 168 may comprise a touchscreen display that can be use to observe operating conditions and change operating parameters of the adjustable operating components.

Using the control system 166, the combine operator may change the parameters of the combine and see, on the output interface 168, if that change has affected the operational conditions of the combine. The output interface 168 may be reconfigured to provide various different readouts. For example, FIG. 2 illustrates two different readout modes via exemplary screenshots related to the real-time operation of the combine 100. In one operating mode, shown in screenshot 201, the output interface 168 illustrates an exemplary set of runtime parameters related to combine throughput. In this mode, the combine operator is presented various information such as time worked, average moisture, various flow rates, and other information related to the operation of the combine 100. In another mode, shown in screenshot 202, the output interface 168 shows the current performance levels of the combine 100. Here, the performance information includes output from the sieve loss sensors 115 (cleaning loss) and the rotor loss sensors 125 (threshing loss). In each case, the loss data is illustrated as a simple bar graph that changes color to represent relative magnitude of the sensor output.

The loss information in screenshot 202 may be used to provide some measure of combine efficiency. However, this information is often displayed in real-time, and the combine operator may not have time to appreciate or interpret the information during operation of the combine. U.S. Pat. No. 8,930,039, which is incorporated by reference herein, describes a system in which loss data is collected and averaged, to help assist the operator with understanding how harvesting rates affect loss data. The data is presented to the operator graphically in the form of an x-y plot of averaged loss data as a function of combine throughput (e.g., mass flow rate through the combine). Such a feature also may be incorporated into embodiments of the present invention, as it can provide a useful output to the operator.

Figure 3:
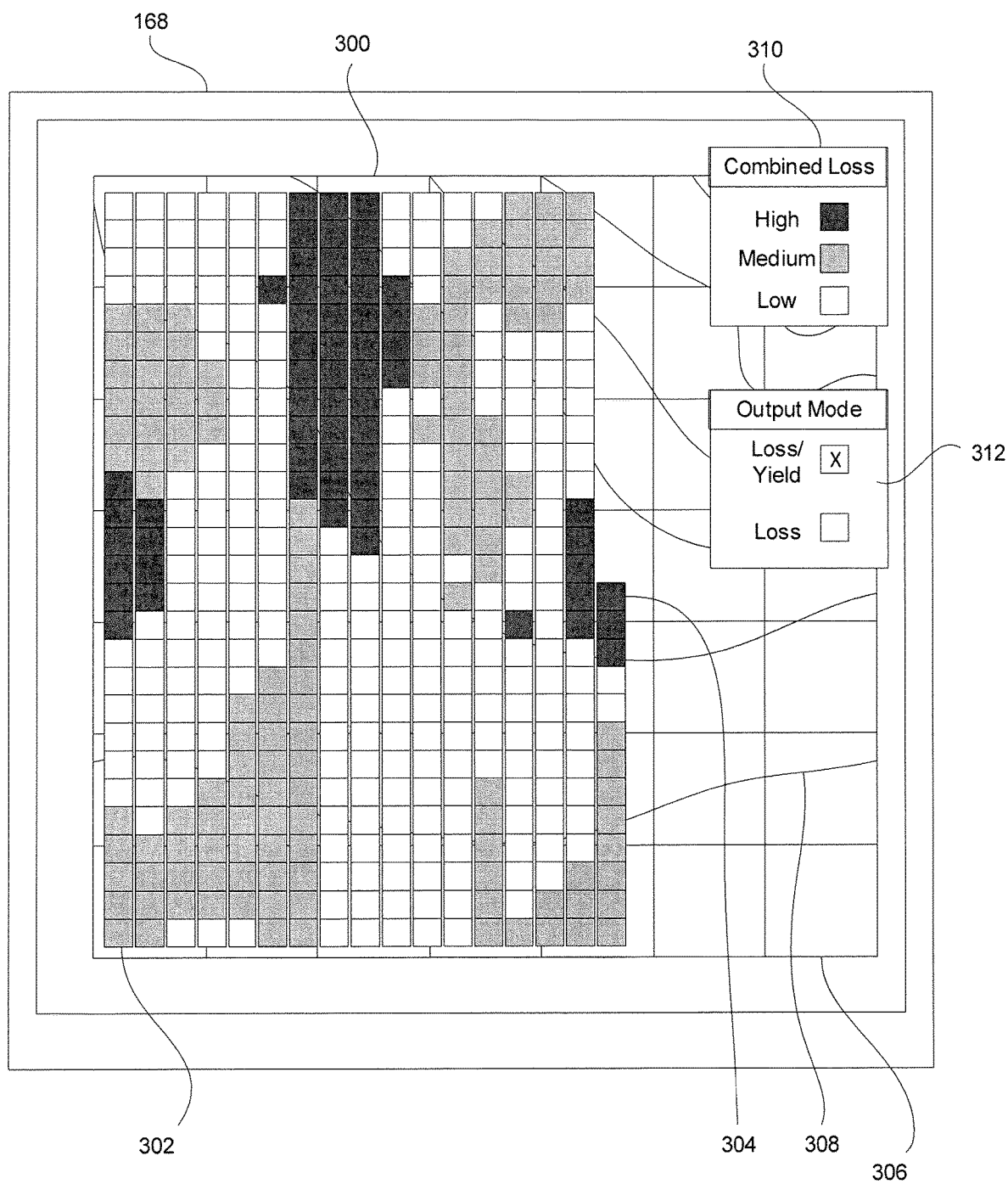
FIG. 3 illustrates an example of a loss monitor map.

An example of a more preferred mode for displaying loss information is illustrated in FIG. 3. Here, the output interface 168 is reconfigured to display a loss monitor map 300. The loss monitor map 300 illustrates a geographical map of the travel path of the combine 100 based on geographical position sensor readings obtained during the operation of the combine, and graphically indicates the loss data readings obtained at discrete locations on the geographical map. In the shown example, the geographic locations of the combine 100 are represented as shaded squares, which begin at a starting location 302. Each square may represent loss data acquired across the entire span of the combine's movement across the region covered by the square, or the squares may represent a particular data point at a smaller or unique location within the area bounded by the square. It is also envisioned that data may be collected to generate a high-resolution display of loss data (i.e., a large number of readings per unit distance), but the map itself may be provided to the operator at a lower resolution (e.g., by averaging values) to make the information more readable. The resolution preferably is sufficient, however, to differentiate individual passes of the combine 100 over the field from one another, so that the operator can compare the data on a row-by-row basis.

The squares appear on the map 300 along a path that tracks the movement of the combine 100 on the field. In this case, the combine 100 has traversed a boustrophedon pattern that progresses along the field in adjacent parallel rows (the first row goes up, the second goes down, and so on). This pattern is typical, as is follows the regular planting pattern for crops. The current position of the combine 100 is represented by the most recent location data at square 304. The map 300 may be illustrated to overlie a known field map represented by a grid 306, topographic lines 308, or the like, but this is not strictly required. The map 300 may automatically scale according to the size of the area that has been harvested, and controls may be provided to allow the operator to zoom into different regions of the map to more closely examine those regions.

As noted above, each square graphically indicates the loss data of the combine 100 at that particular geographic location. Such graphical indication may be generated, for example, by using different degrees of shading to represent different loss levels. In the shown example, white squares have low combined loss (loss from the thresher and separator), light grey squares have moderate combined loss, and dark grey squares have high combined loss. A legend 310 may be provided to instruct the operator how to read the data on the map 300. In other embodiments, different colors may be used to represent different loss levels. In still other embodiments, the loss levels may be represented by the size of the position square or other representative shape (e.g., larger squares representing less loss, and smaller squares representing greater loss). As another example, loss levels may be represented by different symbols (e.g., numerals or arbitrary shapes), such as "0" to represent low loss, and increasing numbers to represent increasing loss levels. The loss data represented in the map can be pure sensor output data (e.g., a direct measure of sensor output, such as voltage or sensor strike frequency), converted to a unit measurement (e.g., bushels per acre), or converted to a proportionate value compared to other measured operating conditions or parameters (e.g., percentage of total yield as measured by a yield monitor). The system also may be configured to allow the operator to select how to display the loss data. For example, a dialog box 312 may be provided to present user-selectable radio buttons that allow the operator to select between showing loss as a percentage of yield ("Loss/Yield") (which has the benefit of ignoring fluctuations in yield), or simply the loss value measured from the loss monitors ("Loss"). Other alternatives and variations will be apparent to persons of ordinary skill in the art in view of the present disclosure.

Any number of different loss levels may be represented, and illustrating a larger number of loss levels might provide more feedback to help control the combine. However, in some cases, the loss levels may be presented in a binary form using only two discrete colors or symbols, with losses below a threshold value being represented by one color or symbol, and losses above the threshold value being represented by the other color or symbol (values at the threshold value can be represented using either symbol, as desired). This embodiment may be useful to provide a more basic representation of the loss monitor data to indicate where the loss data is above or below an acceptable value.

The loss monitor map 300 also may be configured to simultaneously represent additional data to the operator. For example, the squares that form the map may be colored to represent loss data (e.g., a so-called "heat map" ranging from blue to show low loss to red to show high loss), while the size of the squares represent crop yield (e.g., smaller squares representing lower yield and larger squares representing higher yield). As another example, each square may be divided into two parallel bars that are colored to represent different variables, such as loss and yield. Other alternatives and variations will be apparent to persons of ordinary skill in the art in view of the present disclosure.

Of course, the loss monitor map 300 also may be presented on the output interface 168 in conjunction with other information, such as the information shown in FIG. 2 or conventional readout information.

Figure 4:
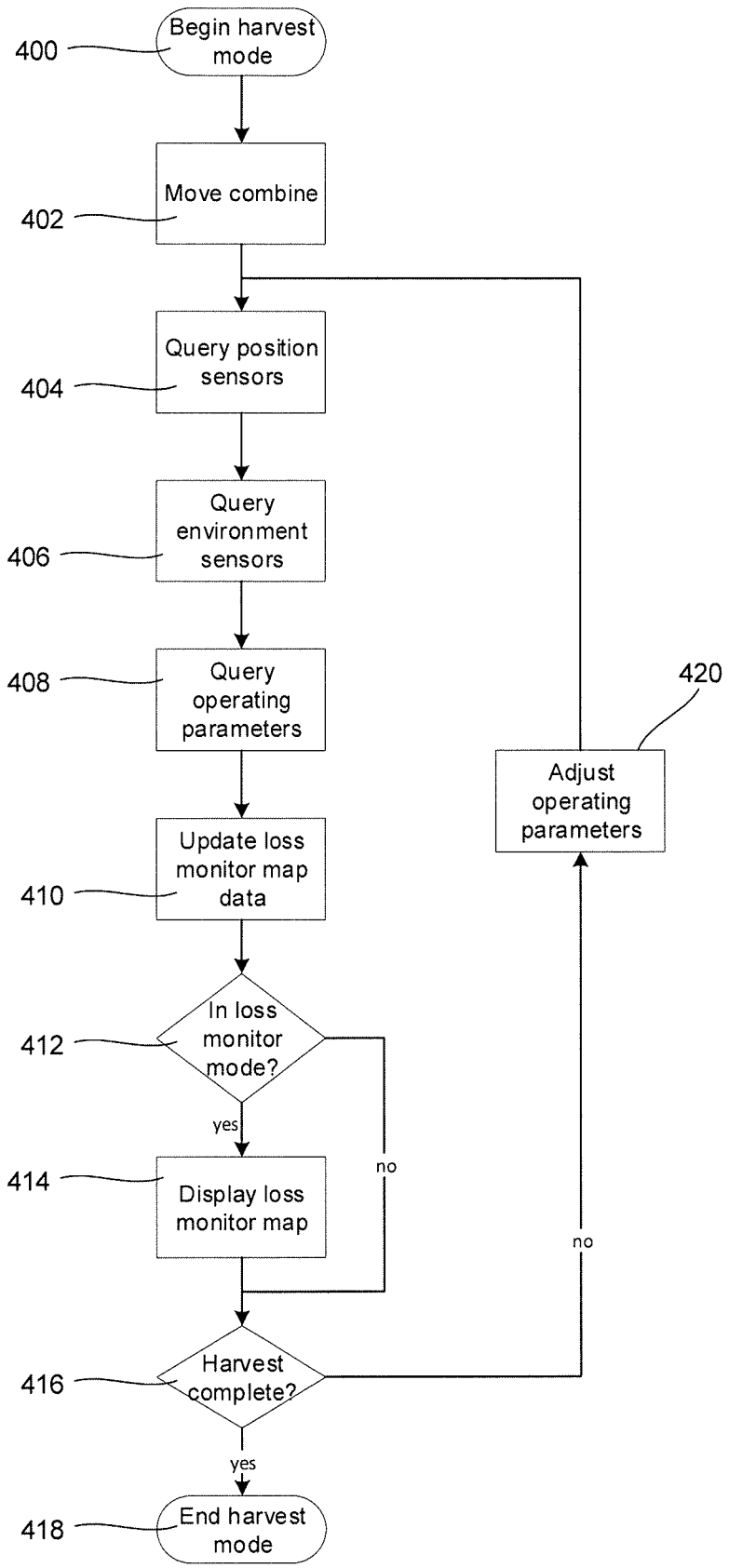
FIG. 4 is a flowchart illustrating and exemplary process for generating data for a loss monitor map.

FIG. 4 provides a flowchart illustrating an exemplary process for generating the loss monitor map 300. In step 400, the combine 100 is activated in a harvesting mode, such as by turning on the combine 100 and setting the combine 100 at the starting point for harvesting operations. At this point, the combine 100 is ready to begin harvesting and the various adjustable components are set at starting operating parameter setting values, which may be selected by the operator based on past experience, data feedback from previous harvesting operations, and so on. The control system 166 has also initialized sensor monitoring to track the operating parameter settings and the environmental sensors, and to perform data processing operations necessary to output the desired information on the output interface 168.

In step 402, the combine 100 begins harvesting and data acquisition by moving forward to harvest and process the crop. As the combine 100 moves, the control system 166 queries various sensors to determine the combine's geographical position, operating parameter settings and performance. For example, in step 404 the control system 166 queries vehicle geographical position sensors to determine where the combine is located within a geographical area. Such geographical position sensors may include any sensors known to be used for determining the position of a vehicle, such as global positioning system receivers, cellular signal tracking systems, laser rangefinders, wire tracking sensors that detect an underground guidewire, and so on. In step 406, the control system 166 queries environment sensors to determine the operating conditions and performance of the combine 100. Such sensors include loss sensors that detect grain being expelled from the combine 100, and may include other sensors such as those conventionally used to determine crop flow rate, crop yield, moisture levels, and so on. Next, in step 408, the control system 166 queries the operating parameters of the combine 100 to record the operating parameter settings of the various different user-changeable operating features of the combine 100. Such operating parameter settings might include, for example, ground speed, thresher rotor speed, concave position, sieve settings, cleaning fan speed, and so on.

The sensor query order shown in steps 404 through 408 of FIG. 4 is not strictly required, and this order may be rearranged or performed essentially simultaneously or in an ad hoc fashion depending on current operating conditions. The sensor queries may be made essentially continuously (e.g., at the maximum rate available according to the clock speed and operating variables of the processor), at intermittent points in time according to a predetermined schedule, at intermitted geographical locations of the combine 100, or according to any other schedule.

The control system 166 also maintains a record of the various sensor readings and operating parameter settings by storing the data in a memory. For example, the control system 166 might store the geographical position sensor readings in a position data set, the operating parameter settings in an operating parameter data set, and loss data readings in a loss data set. Such data sets may be integrated into one or more databases, as known in the art.

In step 410, the control system 166 updates the loss monitor map data. In this process, the control system develops a geographic map of the combine's positions using the position data, and associates loss data readings and operating parameter settings with the position data. The geographical mapping process may use any conventional mapping technique, such as reading global positioning system data, or performing simultaneous localization and mapping using Kalman filtering and sensor fusion techniques. The control system 166 also may be provided with a pre-made geographic map of the region to be harvested, in which case position data is used to indicate the combine's position on the pre-existing map. The operating parameter readings and loss data readings (and possibly other data readings) are associated with the position readings. Thus, the control system 166 records the operating parameters and loss data at the recorded physical location of the combine during each loss monitor data update.

The update step 410 may be performed at any an desired frequency, but it is expected that performing the update too frequently could lead to high processing power and memory requirements, and it might also cause the data to be subject to brief variations in sensor data. Thus, the control system 166 may perform the update step 410 at predetermined intervals to generate more discrete movement "steps" along the map. For example, the update step 410 may be performed once per second, or once per each combine-length movement of the combine across the ground. The control system 166 also may preprocess the raw data before performing the update. For example, the query steps 404 through 408 may operate essentially continuously between successive map data updates to collect a large number of readings, and the control system 166 might average the value of those readings before performing the next map update to help reduce fluctuations caused by transient data variations. Other alternatives and variations will be apparent to persons of ordinary skill in the art in view of the present disclosure.

As indicated above, the output interface 168 might be reconfigurable to display various different output formats. Thus, the loss monitor mapping process steps of querying the sensors and updating the loss monitor map data can be performed in the background even when the operator is using the output interface 168 in a different mode. Accordingly, in step 412, the control system 166 determines whether the output interface 168 is in the loss monitor mapping mode, and, if so, proceeds to step 414 to display the loss monitor map, such as described above, on the output interface 168.

The geographical map that is displayed on the output interface 168 may include the entire travel path, or portions thereof (e.g. a zoom function to view portions of the path in more detail). If the combine is operated in a known territory, then the map also may include known regions beyond the current travel path of the combine, however those regions may be displayed without any associated loss data. As another alternative, the loss monitor mapping data from a previous run in the same territory might be used and displayed as a starting map, which is progressively overwritten as the combine 100 performs the current harvesting operations, which would provide the operator with a comparison of loss data between different harvesting operations.

In step 416, the process periodically (e.g., after each map update) queries whether the harvesting operation is complete. If so, the harvest mode ends in step 418. At this point, the data collected during the foregoing process can be stored in a permanent memory, transmitted wirelessly to other systems, or simply retained as is or erased.

If the harvest is not complete, then the cycle continues with querying the sensors and parameters and updating the loss monitor map data. During this process, the combine operator might change one or more operating parameters, as represented by step 420. Step 420 is shown in FIG. 4 as a discrete step at a particular point in the process flow path, but it will be appreciated that the operator might change a parameter during any part of the process. In addition, one or more of the environmental conditions of the combine 100 might change during the course of this process. For example, the combine 100 might begin operating on uneven terrain, or it the density or moisture content of the crop might change. The effect of any such operating parameter settings or environmental changes on the loss data will then be stored in the loss monitor map data as the process of FIG. 4 continues to operate.

The loss monitor map provided herein provides a unique benefit to the combine operator, and can be integrated into existing control systems having appropriate sensors and the like. In normal use, the loss monitor map might not be used at all times, but during operation of the combine 100, the operator (or a remote observer) can operate the control system 166 to perform a loss mapping routine. Upon execution, the loss mapping routine generates a display on the output interface 168 (or a remote interface) that illustrates a geographical map of the combine's operation path based on the position readings. As explained above, the geographical map graphically indicates each data loss reading associated with each map position, at that particular map position. Thus, the operator can see how the combine's loss readings change throughout the course of harvesting.

This information can be used to modify the operation of the combine 100 in real time, because the operator can quickly and easily see whether a change to the operating parameter settings results in a change in grain loss. This is in contrast to typical systems, in which loss data is constantly fluctuating and provides little help in tuning the combine's operation. This also provides an advantage over other systems that analyze loss data, such as the system in U.S. Pat. No. 8,930,039, by allowing the operator to customize how he or she wishes to utilize the loss data. For example, rather than using time windows to assess effects of operating parameter changes, the operator can actively monitor how parameter changes affect performance over any desired geographic region. The system also allows the operator to easily switch between modes. For example, the operator could operate the combine in the typical yield monitoring mode during the majority of the harvesting operation, but occasionally switch to the loss monitor map (e.g., once per row, or once per several rows) to assess changes in loss throughout the entire field that might be caused by different crop conditions or operating parameters.

Figure 5:
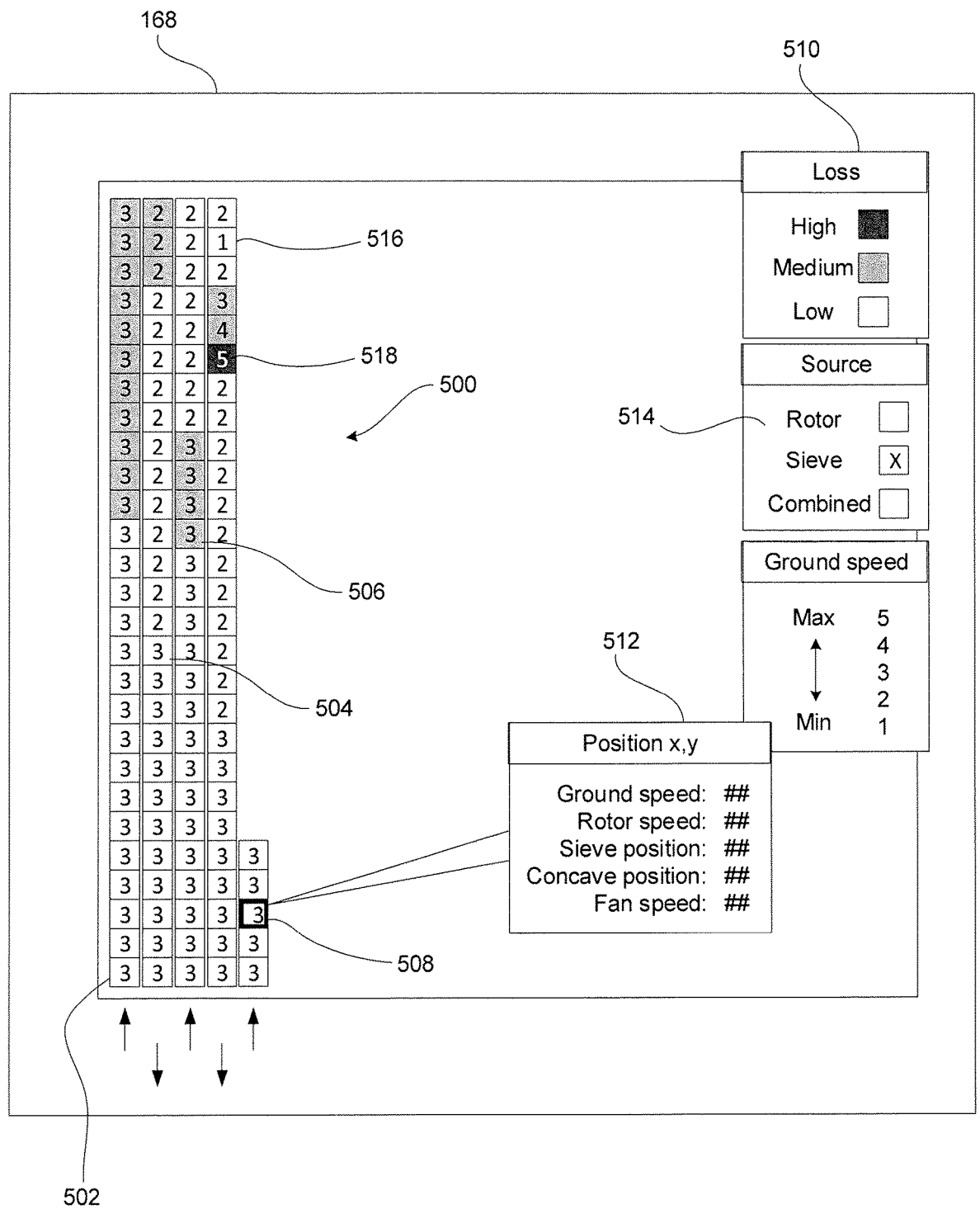
FIG. 5 illustrates another example of a loss monitor map.

The loss monitor map also provides a unique and useful way to evaluate the effects of different operating parameter settings on combine losses. For example, as shown in FIG. 5, the control system 166 may be configured to provide a loss monitor map 500 that simultaneously illustrates both loss data readings and operating parameter settings associated with each location reading on the map. In this example, each square once again represents a position reading (i.e., a geographic location), and the shading of the square represents the loss data reading at that location. In addition, each square also includes a numerical representation of an operating parameter setting. In this case, the operating parameter setting is ground speed (which may have an arbitrary scale of 0-5 or the like), but other settings could be represented in different operation modes. A legend 510 is provided to assist with understanding the data, and arrows or other indicia may be used to illustrate the combine's direction of movement along each row or other travel path.

This output can be readily interpreted by the operator to provide useful operation feedback. For example, in this case, the combine starts at square 502, and travels along a first row (upward in the map) at speed 3. The combine initially has low loss readings as indicated by the white color of the squares. Eventually, however, the loss readings increase to the medium level, as shown by the grey shading of the squares at the upper end of the row. In anticipation of this higher loss upon returning back on the next pass, the operator reduces the speed to setting 2, and shortly after making the turn the combine begins experiencing lower losses. This information suggests to the operator that the north end of the field might—for any number of reasons— require somewhat slower harvesting to maintain low losses. After leaving the north end of the field, the operator returns the speed setting to 3 at square 504, and finds that losses remain low. In the next pass, the operator starts at speed 3, and once again experiences medium losses at the north end of the field at square 506. In response, he reduces speed to 2, and losses again drop. Thus, the operator can use this information to anticipate regions where higher losses might be experienced, and make adjustments to reduce such losses. Similar output can be provided for any number of operating parameters to assist the operator in analyzing what changes are helpful to reduce losses.

The output interface 168 also may configured to allow the operator to select which particular loss monitor data is being observed (e.g., rotor, sieve or combined, or particular individual loss monitors or groups of loss monitors). For example, the output interface 168 may include a dialog box 514 in which the operator can select whether to display the loss monitor data received from the rotor loss monitors, sieve loss monitors, or the combined amount of loss from all loss monitors. In the shown example, the loss monitor map represents data from the sieve loss monitors, and thus provides a comparison of how loss at the sieve changes as a function of changes in the particular operating parameter being monitored. In this case, the parameter is ground speed, but as noted above, any other parameter may be selected (e.g., rotor speed, sieve spacing, fan speed, etc.).

This display of loss as a function of operating parameter can also be used when operating the combine 100 in relatively uniform crop conditions to perform experiments to evaluate how changes in operating parameters affect the losses. For example, the operator might, based on historical data or other information, understand that there is uniform crop growing at the region extending from square 516 to square 518. Thus, the operator can experiment with different parameter settings to see how they affect harvesting of this uniform stretch of crop.

FIG. 5 also illustrates another optional function of the control system 166. Specifically, the control system 166 may be configured to interactively illustrate operating parameter settings associated with particular position readings of the combine 100. For example, an operator may use the input interface to select any particular position reading 508 to query one or more operating parameter settings associate with that position reading. Upon receiving this request, the control system 166 generates a display 512 on the output interface 168 identifying one or more operating parameter settings associated with that position reading. Such a display can also be operated to display operating parameter settings for multiple different position readings, so as to provide a convenient way to compare operating conditions that were present at different locations. Such displays also may be configured to provide environmental conditions and other sensor data, such as moisture content, flow rate, yield, and so on. Other alternatives and variations will be apparent to persons of ordinary skill in the art in view of the present disclosure.

While one benefit of the embodiments discussed above will be to provide instantaneous feedback to help the combine operator, it will be appreciated that the data collected during operation of the combine 100 can be stored and revisited in various forms for later review. For example, during operation of the combine 100, the operator might configure the output interface 168 to display sieve losses as a function of ground speed, as shown in FIG. 5, but after some time (either during or after harvesting) the operator might switch modes such as by selecting the "rotor" or "combined" radio button in interface 514. Upon making this change, the entire loss monitor map can be updated to show how the rotor or combined losses changed as a function of the ground speed. Similarly, the operator can change the observed parameter to any of the other combine's monitored operating devices to see how any changes in those parameters might have affected the loss readings. Other alternatives and variations will be apparent to persons of ordinary skill in the art in view of the present disclosure.

Figure 6:
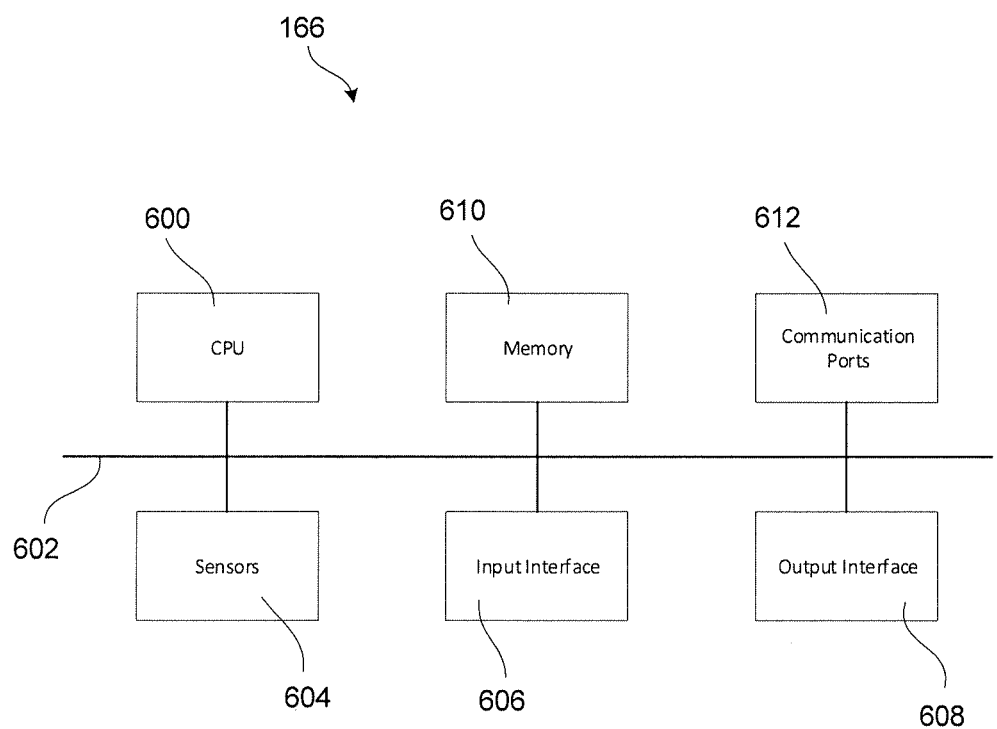
FIG. 6 is a schematic illustration of a control system that may be used in embodiments.

FIG. 6 depicts a block diagram of exemplary hardware and computing equipment the like that may be used as a control system 166 as discussed herein. The control system 166 includes a central processing unit (CPU) 600, which is responsible for performing calculations and logic operations required to execute one or more computer programs or operations. The CPU 600 is connected via a data transmission bus 602, to sensors 604, an input interface 606, an output interface 608, and a memory 610. One or more analog do digital conversion circuits may be provided to convert analog data from the sensors 604 to an appropriate digital signal for processing by the CPU 600, as known in the art. The CPU 600 also may be operatively connected to one or more communication ports 612, such as serial communication ports, wireless communication ports, or the like.

The CPU 600, data transmission bus 602 and memory 610 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other memory (e.g., compact disk, digital disk, solid state drive, flash memory, memory card, USB drive, optical disc storage, etc.). The selection of an appropriate processing system and memory is a matter of routine practice and need not be discussed in greater detail herein.

The sensors 604 include any number of feedback or feed-forward sensors configured to indicate the desired data, such as digital or analog potentiometer geographical position sensors, optical switches, tachometers, piezoelectric sensors, moisture sensors, accelerometers, temperature sensors, and so on.

The input interface 606 may include any number or type of device used to input instructions or data to the CPU 600, such as a keyboard, pointer (e.g., mouse or smart pen), joystick, touchscreen, buttons, switches, and so on. The output interface 608 may comprise any number of user-perceivable signaling devices, such as a color thin-film transistor (TFT) light emitting diode (LED) backlit display, indicator lights, analog or digital gauges, audio speakers, and so on. In some embodiments, the input interface 606 and output interface 608 may be at least partially, or even entirely, integrated into a single unit comprising a touchscreen display that is configured to receive input and provide output. Devices such as this are commercially available from suppliers such as Comark Corporation of Milford, Mass. The input interface 606 and output interface 608 preferably are located within the cab of the combine 100 where they can be accessed by the combine operator. However, all or portions of the input interface 606 and output interface 608 may be located remotely and communicatively connected to the remaining portions of the control system 166 by wireless communication devices, such as cellular or radio communication transceivers. Such remote configurations may allow remote oversight or even complete operation of the combine 100.

The control system 166 includes a program application to perform the desired processes. The program application is stored in a tangible computer readable medium in a non-transitory state in the memory 610, and the processor 600 accesses and performs the program application to perform the various processes described herein. The program application may include one or more individual files defining software modules or instructions for performing the functions described herein and various other functions (e.g., engine control and other combine operations), as known in the art. The memory 610 also may store auxiliary data, common files or databases for storing raw and/or processed data, and other auxiliary data.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural combine comprising:
a threshing and separating system;
at least one loss sensor associated with the threshing and separating system;
a processing device;
a user interface having an input interface and an output interface; and
a non-transitory computer readable storage medium operably connected to the processing device and the user interface and storing a set of instructions that, when executed by the processor, cause the processor to:
simultaneously collect, from a plurality of sensors operably connected to the processing device, data related to the operation of the combine, the data including:
(i) a plurality of geographical position readings from one or more geographical position sensors,
(ii) a plurality of sets of operating parameter settings, each set of operating parameter settings being associated with a respective one of the position readings, wherein each set of operating parameter settings includes at least a respective first operating parameter setting from a first user-changeable operating feature of the combine, and a respective second operating parameter setting from a second user-changeable operating feature of the combine, the second user-changeable operating feature of the combine being different from the first user-changeable operating feature of the combine, and
(iii) a plurality of loss data readings from the at least one loss sensor each loss data reading being associated with a respective one of the position readings,
generate a display at the output interface illustrating a geographical map including the plurality of position readings,
graphically indicate in real time on the geographical map, each loss data reading associated with each position reading illustrated on the geographical map at each position reading's respective location on the geographical map, and
in a first operating state:
graphically indicate in real time on the display, the respective first operating parameter setting from the respective set of operating parameter settings associated with each position reading illustrated on the geographical map
wherein each respective first operating parameter setting is represented by a numerical character, which is superimposed on the display on the geographical map at the respective one of the position readings associated with each respective first operating parameter,
wherein the plurality of respective first operating parameter settings, the plurality of loss data readings and the geographical map are displayed at a same time on the display, and
in a second operating state:
graphically indicate in real time on the display, the respective second operating parameter setting from the respective set of operating parameter settings associated with each position reading illustrated on the geographical map,
wherein each respective second operating parameter setting is represented by a numerical character, which is superimposed on the display on the geographical map at the respective one of the position readings associated with each respective second operating parameter,
wherein the respective second operating parameter settings, the plurality of loss data readings and the geographical map are displayed at a same time on the display.

2. The agricultural combine of claim 1, wherein the at least one loss sensor comprises at least one sieve loss sensor or at least one rotor loss sensor, and the operating parameter setting is one of ground speed, thresher rotor speed, concave position, sieve setting, and cleaning fan speed.

3. The agricultural combine of claim 1, wherein the loss data readings are graphically indicated by discrete colors or symbols, each color or symbol representing one or more respective loss percentage values.

4. The agricultural combine of claim 1, wherein the loss data readings are graphically indicated using two discrete colors or symbols, with each of the loss data readings above a threshold value being graphically indicated using a first color or symbol, and each loss data reading below the threshold value being graphically indicated using a second color or symbol.

5. The agricultural combine of claim 1, wherein the data related to the operation of the combine further comprises a plurality of yield data readings, each yield data reading being associated with a respective one of the position readings, and the set of instructions, when executed by the processor, further cause the processor to simultaneously:

graphically indicate, on the geographical map, each loss data reading associated with each position reading illustrated on the geographical map at each position reading's respective location on the geographical map; and graphically indicate, on the geographical map, each yield data reading associated with each position reading illustrated on the geographical map at each position reading's respective location on the geographical map.

6. The agricultural combine of claim 1, wherein the set of instructions, when executed by the processor, further cause the processor to:

receive an instruction at the input interface from the combine operator to designate a first position reading illustrated on the geographical map; and generate a display at the output interface identifying the respective first operating parameter setting from the respective set of operating parameter settings associated with the first position reading and the respective second operating parameter setting from the respective set of operating parameter settings associated with the first position reading.

7. A system for evaluating performance of a combine, the system comprising:

a processing device;

a user interface having an input interface and an output interface; and a non-transitory computer readable storage medium operably connected to the processing device and the user interface and storing a set of instructions that, when executed by the processor, cause the processor to:

simultaneously collect, from a plurality of sensors operably connected to the processing device, data related to the operation of the combine, the data including:

(i) a plurality of position readings from one or more geographical position sensors, (ii) a plurality of sets of operating parameter settings, each set of operating parameter settings being associated with a respective one of the position readings, wherein each set of operating parameter settings includes at least a respective first operating parameter setting from a first user-changeable operating feature of the combine, and a respective second operating parameter setting from a second user-changeable operating feature of the combine, the second user-changeable operating feature of the combine being different from the first user-changeable operating feature of the combine, and (iii) a plurality of loss data readings from at least one loss sensor each loss data reading being associated with a respective one of the position readings, generate a display at the output interface illustrating a geographical map including the plurality of position readings, graphically indicate in real time on the geographical map, each loss data reading associated with each position reading illustrated on the geographical map at each position reading's respective location on the geographical map, and in a first operating state:

graphically indicate in real time on the display, the respective first operating parameter setting from the respective set of operating parameter settings associated with each position reading illustrated on the geographical map, wherein each respective first operating parameter setting is represented by a numerical character, which is superimposed on the display on the geographical map at the respective one of the position readings associated with each respective first operating parameter, wherein the respective first operating parameter settings, the plurality of loss data readings and the geographical map are displayed at a same time on the display, and in a second operating state:

graphically indicate in real time on the display, the respective second operating parameter setting from the respective set of operating parameter settings associated with each position reading illustrated on the geographical map, wherein each respective second operating parameter setting is represented by a numerical character, which is superimposed on the display on the geographical map at the respective one of the position readings associated with each respective second operating parameter, wherein the respective second operating parameter settings, the plurality of loss data readings and the geographical map are displayed at a same time on the display.

8. The system of claim 7, wherein the at least one loss sensor comprises at least one sieve loss sensor or at least one rotor loss sensor.

9. The system of claim 7, wherein the loss data readings are graphically indicated by discrete colors or symbols, each color or symbol representing one or more respective loss percentage values.

10. The system of claim 7, wherein the loss data readings are graphically indicated using two discrete colors or symbols, with each of the loss data readings above a threshold value being graphically indicated using a first color or symbol, and each loss data reading below the threshold value being graphically indicated using a second color or symbol.

11. The system of claim 7, wherein the data related to the operation of the combine further comprises a plurality of yield data readings, each yield data reading being associated with a respective one of the position readings, and the set of instructions, when executed by the processor, further cause the processor to simultaneously:

graphically indicate, on the geographical map, each loss data reading associated with each position reading illustrated on the geographical map at each position reading's respective location on the geographical map; and graphically indicate, on the geographical map, each yield data reading associated with each position reading illustrated on the geographical map at each position reading's respective location on the geographical map.

12. The system of claim 7, wherein the set of instructions, when executed by the processor, further cause the processor to:

receive an instruction at the input interface from the combine operator to designate a first position reading illustrated on the geographical map; and generate a display at the output interface identifying the respective first operating parameter setting from the respective set of operating parameter settings associated with the first position reading and the respective second operating parameter setting from the respective set of operating parameter settings associated with the first position reading.

13. A method for evaluating performance of a combine, the method comprising:
  simultaneously collecting data related to the operation of the combine, the data including:
    (i) a plurality of geographical position readings,
    (ii) a plurality of sets of operating parameter settings, each set of operating parameter settings being associated with a respective one of the position readings, wherein each set of operating parameter settings includes at least a respective first operating parameter setting from a first user-changeable operating feature of the combine, and a respective second operating parameter setting from a second user-changeable operating feature of the combine, the second user-changeable operating feature of the combine being different from the first user-changeable operating feature of the combine, and
    (iii) a plurality of loss data readings each loss data reading being associated with a respective one of the position readings;
  generating a display at an output interface illustrating a geographical map including the plurality of position readings;
  graphically indicating in real time on the geographical map, each loss data reading associated with each position reading illustrated on the geographical map at each position reading's respective location on the geographical map, and
  in a first operating state:
    graphically indicating in real time on the display, the respective first operating parameter setting from the respective set operating parameter settings associated with each position reading illustrated on the geographical map,
    wherein each respective first operating parameter setting is represented by a numerical character, which is superimposed on the display on the geographical map at the respective one of the position readings associated with each respective first operating parameter,
    wherein the plurality of respective first operating parameter settings, the plurality of loss data readings and the geographical map are displayed at a same time on the display, and
  in a second operating state:
    graphically indicate in real time on the display, the respective second operating parameter setting from the respective set of operating parameter settings associated with each position reading illustrated on the geographical map,
    wherein each respective second operating parameter setting is represented by a numerical character, which is superimposed on the display on the geographical map at the respective one of the position readings associated with each respective second operating parameter,
    wherein the respective second operating parameter settings, the plurality of loss data readings and the geographical map are displayed at a same time on the display.

14. The method of claim 13, wherein the loss data readings comprise loss data readings from a combine sieve and a combine rotor.

15. The method of claim 13, wherein graphically indicating each loss data reading comprises displaying each loss data reading by discrete colors or symbols, each color or symbol representing one or more respective loss percentage values.

16. The method of claim 13, wherein graphically indicating each loss data reading comprises displaying each loss data reading using one of two discrete colors or symbols, with each of the loss data readings above a threshold value being displayed using a first color or symbol, and each loss data reading below the threshold value being displayed using a second color or symbol.

17. The method of claim 13, further comprising, simultaneously with graphically indicating, on the geographical map, each loss data reading associated with each position reading illustrated on the geographical map at each position reading's respective location on the geographical map:
  graphically indicating, on the geographical map, a yield data reading associated with each position reading illustrated on the geographical map at each position reading's respective location on the geographical map.

18. The method of claim 13, further comprising:
  receiving a selection of a first position reading illustrated on the geographical map; and
  generating a display at the output interface identifying the respective first operating parameter setting from the respective set of operating parameter settings associated with the first position reading and the respective second operating parameter setting from the respective set of operating parameter settings associated with the first position reading.

19. The combine of claim 1, wherein the graphically indicating steps are performed simultaneously.

20. The system of claim 7, wherein the graphically indicating steps are performed simultaneously.

21. The method of claim 13, wherein the graphically indicating steps are performed simultaneously.

22. The combine of claim 1, wherein the loss data reading is a numerical character.

* * * * *